United States Patent
Kim et al.

(10) Patent No.: US 9,328,269 B2
(45) Date of Patent: May 3, 2016

(54) PRESSURE-SENSITIVE ADHESIVE COMPOSITION

(71) Applicant: LG CHEM, LTD., Seoul (KR)

(72) Inventors: Kee Young Kim, Daejeon (KR); No Ma Kim, Daejeon (KR); Sung Soo Yoon, Daejeon (KR); Min Ki Lee, Daejeon (KR); Han Na Chi, Seoul (KR)

(73) Assignee: LG CHEM, LTD., Seoul (KR)

( * ) Notice: Subject to any disclaimer, the term of this patent is extended or adjusted under 35 U.S.C. 154(b) by 316 days.

(21) Appl. No.: 14/032,049

(22) Filed: Sep. 19, 2013

(65) Prior Publication Data

US 2014/0016069 A1 Jan. 16, 2014

Related U.S. Application Data

(63) Continuation of application No. PCT/KR2012/002158, filed on Mar. 23, 2012.

(30) Foreign Application Priority Data

Mar. 23, 2011 (KR) .................. 10-2011-0025995
Mar. 23, 2012 (KR) .................. 10-2012-0029992

(51) Int. Cl.
| | | |
|---|---|---|
| C08L 33/00 | (2006.01) |
| C09J 133/10 | (2006.01) |
| C09J 133/04 | (2006.01) |
| G02F 1/1335 | (2006.01) |
| G02B 1/04 | (2006.01) |
| C08K 5/42 | (2006.01) |
| C08K 5/56 | (2006.01) |
| C09J 7/02 | (2006.01) |
| G02B 5/30 | (2006.01) |

(52) U.S. Cl.
CPC .............. *C09J 133/10* (2013.01); *C08K 5/42* (2013.01); *C08K 5/56* (2013.01); *C09J 7/0217* (2013.01); *C09J 133/04* (2013.01); *G02B 1/04* (2013.01); *G02F 1/133528* (2013.01); *G02B 5/3033* (2013.01); *G02F 2202/22* (2013.01); *G02F 2202/28* (2013.01)

(58) Field of Classification Search
CPC ........ C08L 33/10; C08L 33/08; C09J 133/04; C09J 133/08; C09J 133/10
See application file for complete search history.

(56) References Cited

U.S. PATENT DOCUMENTS 7,491,758 B2  2/2009 Amano et al.

FOREIGN PATENT DOCUMENTS

| CN | 1872935 A | 12/2006 |
|---|---|---|
| JP | 2006152235 A | 6/2006 |
| JP | 2007-092056 | 4/2007 |
| JP | 2008-069261 | 3/2008 |
| JP | 2010-132891 | 6/2010 |
| KR | 1020050072567 A | 7/2005 |
| KR | 1020090078204 A | 7/2009 |
| TW | 201307501 A | 2/2013 |

OTHER PUBLICATIONS

Machine translation of JP 2010132891, 2010.*

* cited by examiner

*Primary Examiner* — Wenwen Cai
(74) *Attorney, Agent, or Firm* — Dentons US LLP

(57) ABSTRACT

A pressure-sensitive adhesive composition is provided. The pressure-sensitive adhesive composition can show stable antistatic performance, and in particular can stably maintain its antistatic performance even when the pressure-sensitive adhesive composition is kept for an extended time under extreme conditions or conditions in which environmental changes are severe, and also has excellent general physical properties such as pressure-sensitive adhesive properties, durability and workability.

19 Claims, No Drawings

PRESSURE-SENSITIVE ADHESIVE COMPOSITION

This application is a Continuation Bypass Application of International Patent Application No. PCT/KR2012/002158, filed Mar. 23, 2012, and claims the benefit of Korean Patent Application No. 10-2011-0025995 filed on Mar. 23, 2011, and Korean Patent Application No. 10-2012-0029992 filed on Mar. 23, 2012, in the Korean Intellectual Property Office, the disclosures of which are incorporated herein by reference.

BACKGROUND

1. Field of the Invention

The present application relates to a pressure-sensitive adhesive composition.

2. Discussion of Related Art

In general, the generation of static electricity causes a variety of problems across the entire electronics industry. The static electricity draws fine dust to electronic parts, causing temporary or permanent damage, or malfunction or process delay of the parts in addition to mechanical damage. In order to solve this problem, there is a continuous need to improve antistatic technology with development of the electronics industry.

For example, in manufacture of a liquid crystal display device (LCD), a process of removing a release sheet from a pressure-sensitive adhesive is performed to attach a polarizing plate to a liquid crystal panel. However, static electricity generated in this process affects alignment of crystal displays of the LCD and makes product inspection difficult or causes damage to electronic parts, resulting in an increase in inferior products.

Korean Patent Publication No. 2009-0101761 discloses a pressure-sensitive adhesive composition including an organic ionic salt-based antistatic agent. However, when only an ionic salt is used, a large amount of the ionic salt should be used to reduce the surface resistance of a pressure-sensitive adhesive, which leads to precipitation of ionic salt.

Japanese Patent Publication No. 2005-031282 discloses an optical resin composition which is prepared by blending a metal salt with a resin composition using a monomer having a hydrophilic group such as ethylene oxide. Japanese Patent Publication No. 2005-031282 discloses that the metal salt serves to give conductivity and the hydrophilic monomer serves to reduce a level of electric charge through adsorption of moisture in the air and prevent whitening due to hazing under high temperature/humidity conditions. However, when a hydrophilic monomer is added at a sufficient content to achieve these objects, the physical properties, especially, adhesive strength and durability, of the pressure-sensitive adhesive may be abruptly degraded, and the surface resistance of the pressure-sensitive adhesive may be rapidly increased under high-temperature or high temperature/humidity conditions.

SUMMARY OF THE INVENTION

The present application is directed to providing a pressure-sensitive adhesive composition.

One aspect of the present application provides a pressure-sensitive adhesive composition including an acrylic polymer, an ionic compound which is in a liquid phase at room temperature, and a metal salt which is in a solid phase at room temperature. Here, the acrylic polymer includes a (meth)acrylic acid ester monomer in an amount of 60 parts by weight to 89.9 parts by weight and a (meth)acrylic acid alkylene oxide monomer in an amount of 10 parts by weight to 30 parts by weight as polymerized units, and the pressure-sensitive adhesive composition satisfies the requirements of the following General Relations 1 and 2:

$$B+C \leq 15 \qquad \text{General Relation 1}$$

$$0.05 \leq B; \text{ and } 0 < C \leq 10 \qquad \text{General Relation 2}$$

In General Relations 1 and 2, B represents a weight ratio of the ionic compound relative to 100 parts by weight of the acrylic polymer, and C represents a weight ratio of the metal salt relative to 100 parts by weight of the acrylic polymer.

Hereinafter, the pressure-sensitive adhesive composition will be described in detail.

According to one illustrative embodiment, the pressure-sensitive adhesive composition may be a pressure-sensitive adhesive for optical films which is used for attachment of an optical film. For example, the pressure-sensitive adhesive may be used to attach a polarizing plate to a liquid crystal panel or to attach functional optical films, such as a polarizing plate, a retardation plate and a viewing-angle widening film, to each other. According to another illustrative embodiment, the pressure-sensitive adhesive composition may be a pressure-sensitive adhesive composition for a polarizing plate which is used to attach a polarizing plate to a liquid crystal panel.

The pressure-sensitive adhesive composition includes an acrylic polymer. The acrylic polymer includes a (meth)acrylic acid ester monomer in an amount of 60 parts by weight to 89.9 parts by weight and a (meth)acrylic acid alkylene oxide monomer in an amount of 10 parts by weight to 30 parts by weight as polymerized units.

For example, an alkyl (meth)acrylate may be used as the (meth)acrylic acid ester monomer, and an alkyl (meth)acrylate containing an alkyl group having 1 to 14 carbon atoms may be used in consideration of the cohesion, glass transition temperature or pressure-sensitive adhesive property of a pressure-sensitive adhesive.

Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate. Among these, one or two or more components may be included as polymerized units in the acrylic polymer.

As such, a monomer represented by the following Formula may also be, for example, used as the (meth)acrylic acid alkylene oxide monomer.

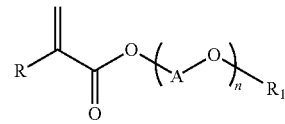

Formula 1

In Formula 1, R represents hydrogen or an alkyl group having 1 to 4 carbon atoms, A represents an alkylene, $R_1$ represents an alkyl group or an aryl group, and n represents an integer ranging from 1 to 12.

In definitions of the substituents of Formula 1, the alkyl group of $R_1$ represents a linear, branched or cyclic alkyl group having 1 to 20 carbon atoms, 1 to 16 carbon atoms, 1 to 12 carbon atoms, 1 to 8 carbon atoms, or 1 to 4 carbon atoms, the alkylene represents a linear, branched or cyclic alkylene having 1 to 20 carbon atoms, 1 to 16 carbon atoms, 1 to 12 carbon atoms, 1 to 8 carbon atoms, or 1 to 4 carbon atoms, and the aryl group represents an aryl group having 6 to 20 carbon atoms or 6 to 12 carbon atoms, for example, a phenyl group.

The monomer of Formula 1 may include at least one selected from the group consisting of alkoxy dialkylene glycol (meth)acrylic acid ester, alkoxy trialkylene glycol (meth) acrylic acid ester, alkoxy tetraalkylene glycol (meth)acrylic acid ester, aryloxy dialkylene glycol (meth)acrylic acid ester, aryloxy trialkylene glycol (meth)acrylic acid ester and aryloxy tetraalkylene glycol (meth)acrylic acid ester, but the present application is not limited thereto. In the specific examples of the monomer, the alkoxy may preferably be an alkoxy having 1 to 4 carbon atoms, more preferably, methoxy or ethoxy, the alkylene glycol may include an alkylene glycol having 1 to 4 carbon atoms, preferably, ethyleneglycol or propyleneglycol, and the aryloxy may include an aryloxy having 6 to 12 carbon atoms, preferably, phenoxy, etc.

The acrylic polymer may include the (meth)acrylic acid ester monomer in an amount of 60 parts by weight to 89.9 parts by weight and the (meth)acrylic acid alkylene oxide monomer in an amount of 10 parts by weight to 30 parts by weight as polymerized units. According to another illustrative embodiment, the acrylic polymer may include the (meth) acrylic acid ester monomer in an amount of 65 parts by weight to 89.9 parts by weight or 70 parts by weight to 89.9 parts by weight and the (meth)acrylic acid alkylene oxide monomer in an amount of 10 parts by weight to 25 parts by weight or 10 parts by weight to 20 parts by weight as polymerized units. Within this range of the weight ratio, the excellent physical properties of the pressure-sensitive adhesive, especially, adhesive strength or durability may be maintained. Even when the pressure-sensitive adhesive is exposed to extreme conditions such as high-temperature or high temperature/humidity conditions for an extended period of time, an antistatic property may be stably maintained.

In this specification, the unit "part(s) by weight" used herein means a weight ratio between respective components, and thus the terms "parts by weight" and "weight ratio" may be used interchangeably.

Also, the acrylic polymer may further include a copolymerizable monomer having a cross-linkable functional group as a polymerized unit. The monomer refers to a monomer which may be copolymerized with the above-described (meth)acrylic acid ester monomer and/or the (meth)acrylic acid alkylene oxide monomer and included as a polymerized unit in the polymer, and also can provide a cross-linkable functional group to a side chain or end of the polymer.

As such, examples of the cross-linkable functional group may include a nitrogen-containing functional group such as a hydroxyl group, a carboxyl group, an epoxy group, an isocyanate group or an amino group. A variety of monomers that can function as described above are known in the field of manufacture of acrylic polymers. According to the present application, all of such monomers may be used herein. Specific examples of the copolymerizable monomer having a cross-linkable functional group may include a hydroxyl group-containing monomer such as 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl group-containing monomer such as (meth)acrylic acid, 2-(meth)acryloyloxy acetic acid, 3-(meth)acryloyloxy propylate, 4-(meth)acryloyloxy butyric acid, acrylic acid dimer, itaconic acid, maleci acid and maleci anhydride, or a nitrogen-containing monomer such as (meth)acrylamide, N-vinyl pyrrolidone or N-vinyl caprolactam, which may be used alone or in combination, but the present application is not limited thereto.

The copolymerizable monomer having a cross-linkable functional group may be included in an amount of 0.1 parts by weight to 10 parts by weight in the polymer. As a result, it is possible to effectively control the physical properties of the pressure-sensitive adhesive, such as durability, pressure-sensitive adhesive strength and cohesion.

The acrylic polymer may further include a monomer represented by the following Formula 2 as a polymerized unit, as necessary. The monomer of Formula 2 may be added to adjust a glass transition temperature and provide other functionalities.

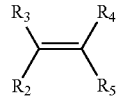

Formula 2

In Formula 2, $R_2$ to $R_4$ each independently represent hydrogen or an alkyl, and $R_5$ represents cyano; phenyl substituted or unsubstituted with an alkyl; an acetyloxy; or $COR_6$, provided that $R_6$ represents amino or glycidyloxy substituted or unsubstituted with an alkyl or alkoxyalkyl.

In definitions of $R_2$ to $R_6$ in Formula 2, the alkyl or alkoxy refers to an alkyl or alkoxy having 1 to 8 carbon atoms, preferably methyl, ethyl, methoxy, ethoxy, propoxy or butoxy.

The monomer of Formula 2 may be included in an amount of 20 parts by weight or less in the polymer, but the content of the monomer may be varied according to a purpose.

The acrylic polymer may be prepared by subjecting a mixture of monomers, which is obtained by blending a variety of the above-described polymers at desired weight ratios, to a conventional polymerization method such as solution polymerization, photopolymerization, bulk polymerization, suspension polymerization or emulsion polymerization.

Also, the pressure-sensitive adhesive composition includes an ionic compound which is in a liquid phase at room temperature. The ionic compound is present in a liquid phase at room temperature. In this specification, the term "room temperature" may refer to a naturally occurring atmospheric temperature at which an adhesive film is not heated or cooled, for example, a temperature of approximately 10° C. to approximately 30° C., approximately 15° C. to approximately 30° C., and approximately 25° C. The ionic compound, which is present in a liquid phase at room temperature, may be used to secure a suitable antistatic property and simultaneously maintain excellent properties of the pressure-sensitive adhesive, such as optical properties, pressure-sensitive adhesive properties and workability. Also, even when the pressure-sensitive adhesive is kept or stored for an extended period of time, it is possible to prevent precipitation of the ionic compound from the pressure-sensitive adhesive and time-dependent change or degradation of the optical transparency or pressure-sensitive adhesive property of the pressure-sensitive adhesive.

The ionic compound may preferably be an organic salt. According to one illustrative embodiment, the ionic compound may be an organic salt including a cationic component such as quaternary ammonium, phosphonium, pyridinium, imidazolium, pyrrolidinium or piperidinium.

The organic salt may preferably include a quaternary ammonium cation. According to one illustrative embodiment, the quaternary ammonium cation may be represented by the following Formula 3.

Formula 3

In Formula 3, $R_7$ to $R_{10}$ each independently represent hydrogen, an alkyl, an alkoxy, an alkenyl or an alkynyl.

In definitions of the substituents in Formula 3, the alkyl or alkoxy may be an alkyl or alkoxy having 1 to 20 carbon atoms, 1 to 12 carbon atoms, 1 to 8 carbon atoms or 1 to 4 carbon atoms. Also, the alkyl or alkoxy may be a linear, branched or cyclic alkyl or alkoxy, and may be optionally substituted with one or more substituents.

Also, in definitions of the substituents in Formula 3, the alkenyl or alkynyl may be an alkenyl or alkynyl having 2 to 20 carbon atoms, 2 to 12 carbon atoms, 2 to 8 carbon atoms or 2 to 4 carbon atoms. In addition, the alkenyl or alkynyl may be a linear, branched or cyclic alkenyl or alkynyl, and may be optionally substituted with one or more substituents.

In definitions of the substituents in Formula 3, when the alkyl, alkoxy, alkenyl or alkynyl is substituted with one or more substituents, examples of the substituent may include hydroxy, alkyl, alkoxy, alkenyl, alkynyl, cyano, thiol, amino, aryl or heteroaryl, but is not limited thereto.

According to one illustrative embodiment, $R_7$ to $R_{10}$ in Formula 3 may each independently represent an alkyl, preferably a linear or branched alkyl having 1 to 12 carbon atoms. More preferably, $R_7$ to $R_{10}$ each independently represent a linear or branched alkyl having 1 to 12 carbon atoms, with the proviso that $R_7$ to $R_{10}$ may not represent an alkyl having the same number of carbon atom(s) at the same time. That is, in the illustrative embodiment, it is preferable that $R_7$ to $R_{10}$ do not represent an alkyl having the same number of carbon atom(s). If all of $R_7$ to $R_{10}$ represent an alkyl having the same number of carbon atom(s), the probability that the organic salt is present in a solid phase at room temperature may be increased.

Specific examples of the cation of Formula 3 may include N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, which may be used alone or in combination.

According to one illustrative embodiment, a cation in which $R_7$ in Formula 3 is an alkyl having 1 to 3 carbon atoms and $R_8$ to $R_{10}$ each independently represent an alkyl having 4 to 20 carbon atoms, preferably 4 to 15 carbon atoms, and more preferably 4 to 10 carbon atoms may be used herein. Such a cation may be used to provide a pressure-sensitive adhesive having more excellent properties, such as optical properties, pressure-sensitive adhesive properties, workability and antistatic properties.

Examples of the anion that may be included in the organic salt may include an anion represented by the following Formula 4.

$$[X(YO_mR_f)_n]^-$$ Formula 4

In Formula 4, X represents nitrogen or carbon, Y represents carbon or sulfur, $R_f$ represents a perfluoroalkyl group, m represents an integer of 1 or 2, and n represents an integer of 2 or 3.

In Formula 4, m may be 1 when Y is carbon, m may be 2 when Y is sulfur, n may be 2 when X is nitrogen, and n may be 3 when X is carbon.

The anion of Formula 4 shows high electronegativity due to the presence of the perfluoroalkyl group ($R_f$) and also have a unique resonance structure. As a result, the anion of Formula 4 may form a weak bond with the cation of Formula 3 and simultaneously show high hydrophobicity. Therefore, the organic salt may show excellent compatibility with the other components (such as the acrylic polymer) of the composition and also provide good antistatic properties even when a small amount of the organic salt is used.

According to one illustrative embodiment, the $R_f$ in Formula 4 may be a perfluoroalkyl group having 1 to 20 carbon atoms, 1 to 12 carbon atoms, 1 to 8 carbon atoms or 1 to 4 carbon atoms. In this case, the perfluoroalkyl group may have a linear, branched or cyclic structure. The anion of Formula 4 may be a sulfonylmethide-based, sulfonylimide-based, carbonylmethide-based or carbonylimide-based anion, and, more particularly, may include tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide or bispentafluoroethanecarbonylimide, which may be used alone or in combination.

According to one illustrative embodiment, the anion of Formula 4 may preferably be bis(perfluoroalkylsulfonylimide). Here the perfluoroalkyl may be a perfluoroalkyl having 1 to 12 carbon atoms, preferably 1 to 8 carbon atoms.

Also, the pressure-sensitive adhesive composition includes a metal salt. According to one illustrative embodiment, the metal salt may include an alkaline metal cation or an alkaline earth metal cation, preferably, an alkaline metal cation. Examples of the cation may include a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), which may be used alone or in combination. According to this embodiment, one or two or more of a lithium ion, a sodium ion, a potassium ion, a magnesium ion, a calcium ion and a barium ion may be preferably used, and a lithium ion may be more preferably used in consideration of ion stability and mobility in a pressure-sensitive adhesive, but the present application is not limited thereto.

Examples of the anion that may be included in the metal salt may include fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) or trispentafluoroethyl trifluorophosphate ($P(C_2F_5)_3F_3^-$), and the anion of Formula 4, which may be selected and used alone or in combination. According to one illustrative embodiment, the anion that may be used herein may include an imide-based anion which is good at functioning as an electron withdrawing group, is substituted with fluorine having hydrophobicity and has high ion stability, but the present application is not limited thereto.

In the pressure-sensitive adhesive composition, a weight ratio between the ionic compound and the metal salt satisfies the requirements of General Relation 1.

That is, the ionic compound and metal salt may be included in an amount of 15 parts by weight or less or 0.5 parts by weight to 12 parts by weight in the pressure-sensitive adhesive composition, based on the sum of 100 parts by weight of the acrylic polymer. Also, a weight ratio (B) of the ionic compound to 100 parts by weight of the acrylic polymer may be 0.05 parts by weight or more, 0.2 parts by weight or more, 0.5 parts by weight or more, or 1 part by weight or more, and a weight ratio (C) of the metal salt to 100 parts by weight of the acrylic polymer may be greater than 0 parts by weight and 10 parts by weight or less, or greater than 0 parts by weight and 8 parts by weight or less.

The pressure-sensitive adhesive may be allowed to show stable antistatic performance by adjusting the weight ratios of the ionic compound and the metal salt as described above. Especially when the pressure-sensitive adhesive is exposed to the extreme condition for a long time, the antistatic performance may be stably maintained, and the workability of the pressure-sensitive adhesive, such as re-workability, may be effectively maintained due to plasticization effect of the ionic compound.

Also, the pressure-sensitive adhesive composition may further include a multifunctional cross-linking agent as a component that can cross-link the acrylic polymer during a curing process. For example, an isocyanate cross-linking agent, an epoxy cross-linking agent, an aziridine cross-linking agent or a metal chelate cross-linking agent may be used as the multifunctional cross-linking agent, and the use of the isocyanate cross-linking agent is preferred.

For example, the isocyanate cross-linking agent that may be used herein may include a diisocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reaction of the diisocyanate compound with a polyol. As such, the polyol may, for example, include trimethylol propane. Also, the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, and the aziridine cross-linking agent may include at least one selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphinoxide, but is not limited thereto. In addition the metal chelate-based cross-linking agent may include a compound in which a multivalent metal such as aluminum, iron, zinc, tin, titanium, antimony, magnesium and/or vanadium coordinates with acetylacetone or ethyl acetoacetate. Among these, one or two or more of the cross-linking agents may be used in the present application, but the cross-linking agent that may be used herein is not limited thereto.

For example, the multifunctional cross-linking agent may be included in an amount of 0.01 parts by weight to 5 parts by weight in the pressure-sensitive adhesive composition, relative to 100 parts by weight of the above-described acrylic polymer. The excellent cohesion or durability of the pressure-sensitive adhesive may be maintained within this content range, and the storage stability may also be enhanced even when the pressure-sensitive adhesive is stored for an extended period of time.

Also, the pressure-sensitive adhesive composition may further include a silane coupling agent. The silane coupling agent may function to increase the close adhesion and adhesive stability of the pressure-sensitive adhesive to improve heat resistance and moisture resistance and also enhance adhesive reliability even when the pressure-sensitive adhesive is kept for an extended period of time under extreme conditions. For example, the silane coupling agent that may be used herein may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane or γ-aminopropyl triethoxy silane, which may be used alone or in combination.

According to one illustrative embodiment, the pressure-sensitive adhesive composition may include a silane coupling agent having a β-cyano group or an acetoacetyl group. For example, the coupling agent may include a compound represented by the following Formula 5 or 6.

$(R_{11})_n Si(R_{12})_{(4-n)}$      Formula 5

$(R_{13})_n Si(R_{12})_{(4-n)}$      Formula 6

In Formula 5 or 6, $R_{11}$ represents a β-cyanoacetyl group, $R_{13}$ represents an acetoacetyl group or an acetoacetylalkyl group, $R_{12}$ represents an alkoxy group, and n represents an integer ranging from 1 to 3.

In Formula 5 or 6, the alkyl may be an alkyl having 1 to 20 carbon atoms, 1 to 16 carbon atoms, 1 to 12 carbon atoms, 1 to 8 carbon atoms or 1 to 4 carbon atoms. In this case, such an alkyl may be linear, branched or cyclic.

In Formula 5 or 6, the alkoxy may be an alkoxy having 1 to 20 carbon atoms, 1 to 16 carbon atoms, 1 to 12 carbon atoms, 1 to 8 carbon atoms or 1 to 4 carbon atoms. In this case, such an alkoxy may be linear, branched or cyclic.

In addition, n in Formula 5 or 6 may preferably be 1 to 2, and more preferably 1.

For example, examples of the compound of Formula 5 or 6 may include acetoacetylpropyl trimethoxy silane, acetoacetylpropyl triethoxy silane, β-cyanoacetyl trimethoxy silane or β-cyanoacetyl triethoxy silane, but the present application is not limited thereto.

The silane coupling agent in the pressure-sensitive adhesive composition may be included in an amount of 0.01 parts by weight to 5 parts by weight, preferably 0.01 parts by weight to 1 part by weight, relative to 100 parts by weight of the acrylic polymer. Within this content range, the silane coupling agent may function to effectively endow a pressure-sensitive adhesive with desired physical properties.

The pressure-sensitive adhesive composition may further include a tackifier, as necessary. For example, the tackifier may include a hydrocarbon resin or a hydrogenated product thereof, a rosin resin or a hydrogenated product thereof, a rosin ester resin or hydrogenated product thereof, a terpene resin or a hydrogenated product thereof, a terpene phenol resin or a hydrogenated product thereof, a polymerized rosin resin or polymerized rosin ester resin, which may be used alone or in combination, but the present application is not limited thereto. In the pressure-sensitive adhesive composition, the tackifier may be included in an amount of 100 parts by weight or less, relative to 100 parts by weight of the acrylic polymer.

Also, the pressure-sensitive adhesive composition may further include at least one additive selected from the group consisting of an epoxy resin, a curing agent, a UV stabilizer, an antioxidant, a coloring agent, a reinforcing agent, a filler, an antifoaming agent, a surfactant and a plasticizer, without affecting the desired effects of the present application.

The pressure-sensitive adhesive composition may satisfy the following General Relation 3.

$$\Delta SR_A = \log SR2 - \log SR1 \leq 1.0 \quad \text{General Relation 3}$$

In General Relation 3, the "SR1" represents a surface resistance measured after curing the pressure-sensitive adhesive composition and then maintaining for 24 hours at conditions of 23° C. and 50% relative humidity, and the "SR2" represents a surface resistance measured after curing the same pressure-sensitive adhesive composition as that used for the measurement of SR1, maintaining for 500 hours at conditions of 60° C. and 90% relative humidity, and then maintaining again for 24 hours at conditions of 23° C. and 50% relative humidity.

Also, the pressure-sensitive adhesive composition may satisfy the following General Relation 4.

$$\Delta SR_B = \log SR3 - \log SR1 \leq 1.0 \quad \text{General Relation 4}$$

In General Relation 4, the "SR1" is the same as defined in the General Relation 3, and the "SR3" represents a surface resistance measured after curing the same pressure-sensitive adhesive composition as that used for the measurement of SR1, maintaining for 500 hours at a condition of 80° C., and then maintaining again for 24 hours at conditions of 23° C. and 50% relative humidity.

As such, the term "curing" as used herein may refer to a process of transforming a pressure-sensitive adhesive composition so as to express a pressure-sensitive adhesivity through a physical or chemical reaction. Such curing may be, for example, a process of treating a pressure-sensitive adhesive composition under conditions in which an acrylic polymer and a multifunctional cross-linking agent included in the composition may trigger a cross-linking reaction.

In this specification, the abbreviation "R.H." stands for relative humidity.

Specific conditions and methods of measuring the surface resistance of General Relations 3 and 4 are described with reference to the following Examples.

When $\Delta SR_A$ or $\Delta SR_B$ exceeds 1.0, the surface resistance of a composition when prepared into a pressure-sensitive adhesive is highly changed in a time-dependent manner. Therefore, application of the pressure-sensitive adhesive may be limited. Also, the lower $\Delta SR_A$ and $\Delta SR_B$ become, the more advantageous $\Delta SR_A$ and $\Delta SR_B$ become. As such, there are no particular lower limits on $\Delta SR_A$ and $\Delta SR_B$.

In addition, the pressure-sensitive adhesive composition may have a gel content after curing of 50 weight % to 90 weight %, preferably 70 weight % to 90 weight %. The gel content after curing may be calculated from the following General Relation 5.

$$\text{gel fraction (\%)} = B/A \times 100 \quad \text{General Relation 5}$$

In General Relation 5, the "A" represents a weight measured after curing the pressure-sensitive adhesive composition, and the "B" represents a dry weight of non-dissolved parts collected after immersing the cured pressure-sensitive adhesive composition having a weight of "A" in ethyl acetate at room temperature for 48 hours.

If the gel fraction after curing is less than 50 weight %, the durability of the pressure-sensitive adhesive may be degraded under high temperature or high humidity conditions, whereas the stress relaxation of the pressure-sensitive adhesive may be degraded when the gel fraction after curing exceeds 90 weight %.

Also, the pressure-sensitive adhesive composition may have a peel strength of 150 gf/25 mm or more or 250 gf/25 mm or more. The peel strength may be measured at a peel angle of 180 degrees and a peel rate of 0.3 m/min after attaching the pressure-sensitive adhesive composition in the form of a pressure-sensitive adhesive to glass such as soda lime glass. The peel strength may be, for example, measured after the pressure-sensitive adhesive composition is used to prepare a pressure-sensitive adhesive polarizing plate as will be described later, and the prepared pressure-sensitive adhesive polarizing plate is attached to the glass and kept for 24 hours under conditions of a temperature of 23° C. and 50% relative humidity. When the peel strength is set to 150 gf/25 mm or more, the pressure-sensitive adhesive composition for polarizing plates can have excellent durability. There is no particular lower limit on the peel strength. However, the peel strength may be adjusted to 2,500 gf/25 mm or less or 1,500 gf/25 mm or less in consideration of cuttability or re-workability.

In addition, the present application is directed to providing a polarizing plate including a polarizer, and a pressure-sensitive adhesive layer. The pressure-sensitive adhesive layer is formed on one or both surfaces of the polarizer, is used to attach the polarizing plate to a liquid crystal panel, and also includes the pressure-sensitive adhesive composition in a cured state.

The polarizer is not particularly limited. Thus, any kinds of the polarizer known in the art may be used. The polarizer is a functional film that can extract light oscillating in only one direction from incident light oscillating in multiple directions. For example, such a polarizer may be configured so that a dichroic dye can absorb to and be arranged on a polyvinylalcohol-based resin film. The polyvinylalcohol-based resin forming the polarizer may be, for example, obtained by gelling a polyvinylacetate-based resin. In this case, the polyvinylacetate-based resin that may be used herein may include a homopolymer of vinyl acetate as well as a copolymer of vinyl acetate and another monomer copolymerizable with the vinyl acetate. As such, examples of the monomer copolymerizable with the vinyl acetate may include, but are not limited to, an unsaturated carbonic acid, an olefin, a vinylether, an unsaturated sulfonic acid and an acrylamid having an ammonium group, which may be used alone or in combination. The polarizer may be prepared by elongating the polyvinylalcohol-based resin film, staining the resin film with a dichroic dye to adsorb the resin film to the dichroic dye, treating the resin film with an aqueous boric acid solution and washing the resin film. Iodine or dichroic organic dyestuff may be used as the dichroic dye.

Also, the polarizing plate may further include a protective film which is attached to one or both surfaces of the polarizer. In this case, the pressure-sensitive adhesive layer may be formed on one surface of the protective film. Kinds of the protective film are not particularly limited. For example, the protective film that may be used herein may include a cellulose-based film such as triacetyl cellulose (TAC); a polyester-based film such as a polycarbonate film or poly(ethylene terephthalet) (PET); a polyethersulfone-based film; or a film having a single-layer structure or stacked structure of two or more layers, such as a polyethylene film, a polypropylene film or a polyolefin-based film formed of a resin having a cyclo-based or norbornene structure or an ethylene-propylene copolymer.

Also, the polarizing plate may further include at least one functional layer selected from the group consisting of a protective layer, a reflective layer, an anti-glare layer, a retardation plate, a wide-viewing angle compensation film and a brightness enhancement film.

A method of forming a pressure-sensitive adhesive layer on such a polarizing plate is not particularly limited. For example, the polarizing plate may be formed by coating and curing the above-described pressure-sensitive adhesive composition. In this process, the polarizing plate may be prepared by directly coating a pressure-sensitive adhesive composition onto a polarizing plate and curing the pressure-sensitive adhesive composition, or by coating a pressure-sensitive adhesive composition onto a release agent-treated surface of a release film and curing the pressure-sensitive adhesive composition, followed by transferring the pressure-sensitive adhesive composition to a polarizing plate.

The coating of the pressure-sensitive adhesive composition may be performed using a conventional device such as a bar coater.

In addition, a method of curing a pressure-sensitive adhesive composition is not particularly limited. For example, the method may be performed by maintaining the coating layer at a proper temperature so as to initiate a cross-linking reaction of a multifunctional cross-linking agent with an acrylic polymer included in the coating layer.

In addition, the present application is directed to providing a liquid crystal display (LDC) device including a liquid crystal panel and the polarizing plate attached to one or both surfaces of the liquid crystal panel.

In the LDC, various liquid crystal panels known in the art, for example, liquid crystal panels of active matrix mode such as twisted nematic (TN), super-twisted nematic (STN), ferroelectric (F) and polymer-dispersed (PD) modes; liquid crystal panels of active matrix mode such as two-terminal and three-terminal modes; liquid crystal panels of an in-plane switching (IPS) mode and a vertical alignment (VA) mode, may be applied as the liquid crystal panel.

Furthermore, the kinds of other components of the LCD, for example, upper/lower substrates (for example, a color filter substrate or an array substrate) are not particularly limited, and the components known in the art may be used without limitation.

DETAILED DESCRIPTION OF ILLUSTRATIVE EMBODIMENTS

Hereinafter, illustrative embodiments of the present application will be described in detail. However, the present application is not limited to the embodiments disclosed below, but can be implemented in various forms. The following embodiments are described in order to enable those of ordinary skill in the art to embody and practice the present application.

The physical properties of the pressure-sensitive adhesive layers prepared in the Examples and Comparative Examples were evaluated according to the following evaluation method.

1. Evaluation of Surface Resistance of Pressure-Sensitive Adhesive Layer

A pressure-sensitive adhesive polarizing plate having a pressure-sensitive adhesive formed therein was cut into pieces having a width of 50 mm and a length of 50 mm to form test samples. Then, a releasable PET attached to a pressure-sensitive adhesive layer of each test sample was removed, and the surface resistance was measured.

The surface resistance was measured according to the manufacturer's manual using MCP-HT 450 equipment (commercially available from Mitsubishi chemical, Japan).

The surface resistance (SR1) before a durability test was measured after maintaining the cut test samples for 24 hours under 23° C. and 50% relative humidity conditions, removing the releasable PET film from the polarizing plate and then applying a voltage of 500 Volt to the polarizing plate for 1 minute.

The surface resistance (SR2) after a heat/humidity resistant durability test and surface resistance (SR3) after a heat-resistant durability test were measured after the polarizing plates were stored under heat/humidity resistant conditions (60° C. and 90% relative humidity for 500 hours) and heat-resistant conditions (80° C. for 500 hours), respectively, and re-stored at 23° C. and 50% relative humidity for 24 hours, releasable PET films were peeled, and a voltage of 500 Volt was applied to the polarizing plates for 1 minute.

2. Durability/Reliability

Each of the polarizing plates prepared in the Examples and Comparative Examples was cut into pieces having a width of 180 mm and a length of 220 mm to prepare test samples. The test samples were attached to glass. A pressure applied during the attachment was approximately 5 kg/cm$^2$, and this procedure was carried out in a clean room so as to prevent the inflow of foreign substances or bubbles.

The heat/humidity resistant durability was evaluated according to the following evaluation criteria by keeping the glass, to which the polarizing plate is attached, under heat/humidity resistant conditions (60° C. and 90% relative humidity) for 1,000 hours and observing the appearance of bubbles and peels, and the heat-resistant durability was evaluated by keeping the test samples under a heat-resistant condition (a temperature of 80° C.) for 1,000 hours and observing the appearance of bubbles and peels. Also, the durability was evaluated by keeping the test samples under a heat-resistant or heat/humidity resistant condition and storing the samples at room temperature for 24 hours.

The evaluation of the heat/humidity resistant or heat-resistant durability was carried out after the test sample was kept under the heat/humidity resistant or heat-resistant condition and maintained at room temperature for 24 hours.

<Evaluation Criteria for Durability>
○: Bubbles and peels are not generated.
Δ: Bubbles and/or peels are slightly generated.
x: Bubbles and/or peels are highly generated.

2. Transparency

The transparency of the pressure-sensitive adhesive was evaluated according to the following evaluation criteria by keeping a pressure-sensitive adhesive under a heat-resistant condition or a heat/humidity resistant condition as in the durability/reliability test and observing the pressure-sensitive adhesive with the naked eye.

<Evaluation Criteria for Transparency>
○: Both of a pressure-sensitive adhesive kept under a heat-resistant condition and a pressure-sensitive adhesive kept under a heat/humidity resistant condition are transparent.
x: One of a pressure-sensitive adhesive kept under a heat-resistant condition and a pressure-sensitive adhesive kept under a heat/humidity resistant condition is not transparent.

3. Peel Strength

Each of the pressure-sensitive adhesive polarizing plates prepared in the Examples or Comparative Examples was cut into pieces having a width of 25 mm and a length of 100 mm to prepare test samples. Thereafter, a releasable PET film attached to a pressure-sensitive adhesive layer was peeled off, and the pressure-sensitive adhesive polarizing plate was then attached to glass (i.e., soda lime glass) using a 2 kg roller according to the JIS Z 0237 standard. Subsequently, the glass to which the polarizing plate was attached was pressured in an autoclave (50° C., 5 atm.) for approximately 20 minutes, and stored for 24 hours under constant temperature/humidity conditions (23° C., 50% relative humidity) to prepare samples. Then, the peel strength was evaluated using TA equipment (Texture analyzer commercially available from Stable Micro Systems Ltd., GB.) by peeling the polarizing plate from the glass at a peel rate of 0.3 m/min and a peel angle of 180 degrees.

Preparative Example 1

79 parts by weight n-butyl acrylate (n-BA), 5 parts by weight ethyl acrylate, 15 parts by weight ethoxy diethyleneglycol acrylate and 1 part by weight 2-hydroxyethyl acrylate were put into a 1 L reactor through which nitrogen gas was refluxed, and with which a cooling device to facilitate the temperature control was equipped. Thereafter, the reactor was purged with nitrogen gas for 60 minutes to remove oxygen, and maintained at a temperature of 60° C. Subsequently, 0.05 parts by weight azobisisobutyronitrile (AIBN) as a reaction initiator and 0.01 parts by weight n-dodecylmercaptan (n-DDM) were further added, and the resulting mixture was reacted. After the reaction, the reaction mixture was diluted with ethyl acetate to prepare a solution of acrylic polymer (A1) having a weight average molecular weight of 1,300,000 and a solid concentration of 25 weight %.

Preparative Examples 2 to 8

Solutions of acrylic polymer (A2 to A8) were prepared in the same manner as in Preparative Example 1, except that the components and weight ratios of the monomers were adjusted as listed in the following Table 1 and an amount of an initiator used was adjusted in consideration of the desired molecular weight. However, since a polymerization reaction was not properly induced in the monomer composition of Preparative Example 8, it was impossible to prepare a polymer.

TABLE 1

|  |  | Preparative Examples | | | | | | | |
|---|---|---|---|---|---|---|---|---|---|
|  |  | 1 | 2 | 3 | 4 | 5 | 6 | 7 | 8 |
| polymer solutions | | A1 | A2 | A3 | A4 | A5 | A6 | A7 | A8 |
| Mono- mer | n-BA | 79 | 74 | 68.5 | 54 | 94 | 99 | 89 | 59 |
|  | EA | 5 | 5 | 15 | 15 | — | — | — | — |
| comp- osition | ECA | 15 | — | 10 | 10 | — | — | — | 40 |
|  | MEA | — | 15 | 5 | 15 | — | — | 5 | — |
|  | HEA | 1 | 6 | 1 | 6 | — | 1 | 6 | 1 |
|  | AA | — | — | 0.5 | — | 6 | — | — | — |
| Mw (×10,000) | | 130 | 125 | 120 | 120 | 190 | 180 | 150 | — |

Content unit: part(s) by weight
n-BA: n-butyl acrylate
EA: ethyl acrylate
ECA: ethoxy diethyleneglycol acrylate
MEA: methoxy ethyl acrylate
HEA: 2-hydroxyethyl acrylate
AA: acrylic acid
Mw: weight average molecular weight Example 1

Preparation of Pressure-Sensitive Adhesive Composition (Coating Solution)

0.2 parts by weight of a multifunctional cross-linking agent (tolylenediisocyanate adduct of trimethylolpropane, TDI-1), 5 parts by weight of an ionic compound, tributylmethylammonium bis(trifluorosulfonyl)imide, which was in a liquid phase at room temperature, and 5 parts by weight of a metal salt, lithium bis(trifluorosulfonyl)imide, which was in a solid phase at room temperature, were blended based on a solid content of 100 parts by weight of the acrylic polymer solution (A1) prepared in Preparative Example 1. Thereafter, the resulting mixture was diluted with ethyl acetate so that a solid content of the mixture could amount to approximately 10 to 15 weight %, thereby preparing a coating solution (pressure-sensitive adhesive composition).

Preparation of Pressure-Sensitive Adhesive Polarizing Plate

The prepared coating solution was coated onto a release agent-treated surface of a PET film (MRF-38 commercially available from Mitsubishi Corporation) so that a coating layer could have a thickness after drying of 25 μm, and aged under proper condition to form a pressure-sensitive adhesive layer. Thereafter, the prepared pressure-sensitive adhesive layer was laminated on one surface of a protective film of an iodine-based polarizing plate to prepare a pressure-sensitive adhesive polarizing plate Examples 2 to 5 and Comparative Examples 1 to 7

Polarizing plates were prepared in the same manner as in Example 1 except that blending components and contents of the pressure-sensitive adhesive compositions (coating solutions) were adjusted as listed in the following Table 2.

TABLE 2

|  | Examples | | | | | Comparative Examples | | | | | | | |
|---|---|---|---|---|---|---|---|---|---|---|---|---|---|
|  | 1 | 2 | 3 | 4 | 5 | 1 | 2 | 3 | 4 | 5 | 6 | 7 | 8 |
| Kinds of polymers | A1 | A2 | A3 | A4 | A4 | A1 | A4 | A4 | A5 | A5 | A6 | A7 | A3 |
| Polymer content | 100 | 100 | 100 | 100 | 100 | 100 | 100 | 100 | 100 | 100 | 100 | 100 | 100 |

TABLE 2-continued

|  |  | Examples | | | | | Comparative Examples | | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 | 8 |
| Cross-linking agent content | | 0.2 | 0.2 | 0.2 | 0.2 | 0.2 | 0.2 | 0.2 | 0.2 | 2.0 | 2.0 | 0.1 | 0.1 | 0.2 |
| Ionic compound | Kinds | ○1 | ○2 | ○3 | ○1 | ○2 | — | — | ○1 | — | ○1 | — | ○2 | ○2 |
|  | Content | 5 | 3 | 8 | 1 | 10 | — | — | 25 | — | 1 | — | 15 | 20 |
| Metal salt | Kinds | I1 | I1 | I1 | I1 | I1 | I1 | I1 | — | I1 | I1 | I1 | — | I1 |
|  | Content | 5 | 7 | 7 | 3 | 5 | 7 | 10 | — | 3 | 3 | 20 | — | 15 |

Content unit: part(s) by weight
Cross-linking agent: a tolylenediisocyanate adduct of trimethylolpropane (TDI-1)
○1: tributylmethylammonium bis(trifluorosulfonyl)imide
○2: trioctylmethylammonium bis(trifluorosulfonyl)imide
○3: hexamethylpyridinium hexafluorophosphate
I1: lithium bis(trifluorosulfonyl)imide Physical properties of the pressure-sensitive adhesive polarizing plates prepared in the Examples and Comparative Examples were evaluated. The evaluation results are summarized in the following Tables 3 and 4.

TABLE 3

|  |  | Examples | | | | |
|---|---|---|---|---|---|---|
|  |  | 1 | 2 | 3 | 4 | 5 |
| Pressure-sensitive adhesive transparency | | ○ | ○ | ○ | ○ | ○ |
| Surface resistance ($\Omega/\square$) | SR1 | $4.0 \times 10^8$ | $3.0 \times 10^8$ | $2.8 \times 10^8$ | $1.5 \times 10^9$ | $6.7 \times 10^8$ |
|  | SR2 | $8.0 \times 10^8$ | $9.2 \times 10^8$ | $8.5 \times 10^8$ | $7.0 \times 10^9$ | $9.0 \times 10^8$ |
|  | SR3 | $5.0 \times 10^8$ | $4.4 \times 10^8$ | $3.4 \times 10^8$ | $3.0 \times 10^9$ | $9.0 \times 10^8$ |
| Time-dependent change | $\Delta SR_A$ | <1 | <1 | <1 | <1 | <1 |
|  | $\Delta SR_B$ | <1 | <1 | <1 | <1 | <1 |
| Durability | Heat-resistance | ○ | ○ | ○ | ○ | ○ |
|  | Damping-resistance | ○ | ○ | ○ | ○ | ○ |
| Peel strength (g/25 mm) | | 820 | 850 | 720 | 860 | 760 |

TABLE 4

|  |  | Comparative Examples | | | | | | | |
|---|---|---|---|---|---|---|---|---|---|
|  |  | 1 | 2 | 3 | 4 | 5 | 6 | 7 | 8 |
| Transparency | | ○ | ○ | ○ | ○ | ○ | ○ | X | ○ |
| Surface resistance ($\Omega/\square$) | SR1 | $3.8 \times 10^8$ | $2.3 \times 10^8$ | $2.3 \times 10^8$ | $3.2 \times 10^{10}$ | $1.0 \times 10^{10}$ | $3.1 \times 10^8$ | $2.3 \times 10^9$ | $8.7 \times 10^7$ |
|  | SR2 | $5.2 \times 10^9$ | $4.2 \times 10^9$ | $6.7 \times 10^8$ | $9.4 \times 10^{11}$ | $3.5 \times 10^{11}$ | $1.2 \times 10^{11}$ | $5.6 \times 10^9$ | $7.0 \times 10^8$ |
|  | SR3 | $6.7 \times 10^8$ | $4.0 \times 10^8$ | $9.1 \times 10^8$ | $1.1 \times 10^{11}$ | $5.9 \times 10^{10}$ | $9.5 \times 10^9$ | $7.8 \times 10^9$ | $1.2 \times 10^8$ |
| Time-dependent change | $\Delta SR_A$ | >1 | >1 | <1 | >1 | >1 | >1 | <1 | <1 |
|  | $\Delta SR_B$ | <1 | <1 | <1 | <1 | <1 | >1 | <1 | <1 |
| Durability | Heat-resistance | ○ | ○ | X | ○ | ○ | Δ | X | X |
|  | Damping-resistance | ○ | ○ | Δ | ○ | ○ | X | X | X |
| Peel strength (gf/25 mm) | | 810 | 780 | 750 | 920 | 900 | 250 | 1040 | 630 |

According to the illustrative embodiments of the present application, a pressure-sensitive adhesive that exhibits stable antistatic performance, and in particular stably maintains its antistatic performance even when the pressure-sensitive adhesive is kept for an extended time under extreme conditions or conditions in which environmental changes are severe, and also has excellent general physical properties such as pressure-sensitive adhesive properties, durability and workability, may be provided.

What is claimed is:

1. A pressure-sensitive adhesive composition comprising;
an acrylic polymer, comprising, as polymerized units, 60 to 89.9 parts by weight of (meth)acrylic acid ester monomer and 10 to 30 parts by weight of (meth)acrylic acid alkylene oxide monomer;
an ionic compound that is in a liquid phase at room temperature; and
a metal salt that is in a solid phase at room temperature,
the pressure-sensitive adhesive composition satisfying the following General Relations 1 and 2:

$$B+C \leq 15 \qquad \text{General Relation 1}$$

$$1 \leq B; \text{ and } 0.1 < C \leq 10 \qquad \text{General Relation 2}$$

wherein the "B" is a weight ratio of the ionic compound relative to 100 parts by weight of the acrylic polymer, and the "C" is a weight ratio of the metal salt relative to 100 parts by weight of the acrylic polymer
and wherein the pressure-sensitive adhesive composition further satisfies the requirements of the following General Relation 3:

$$\Delta SR_A = \log SR2 - \log SR1 \leq 1.0 \qquad \text{General Relation 3}$$

wherein "SR1" is a surface resistance measured after curing the pressure-sensitive adhesive composition and then maintaining for 24 hours at 23° C. and 50% relative humidity, and "SR2" is a surface resistance measured after curing the same pressure-sensitive adhesive composition as that used for the measurement of SR1' maintaining for 500 hours at 60° C. and 90% relative humidity, and then maintaining again for 24 hours at 23° C. and 50% relative humidity.

2. The pressure-sensitive adhesive composition of claim 1, wherein the (meth)acrylic acid ester monomer is an alkyl (meth)acrylate.

3. The pressure-sensitive adhesive composition of claim 1, wherein the (meth)acrylic acid alkylene oxide monomer is represented by the following Formula 1:

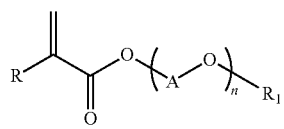

Formula 1 wherein R is hydrogen or an alkyl group having 1 to 4 carbon atoms, A is an alkylene, $R_1$ is an alkyl group or an aryl group, and n is a number ranging from 1 to 12.

4. The pressure-sensitive adhesive composition of claim 1, wherein the acrylic polymer further comprises, as a polymerized unit, 0.1 to 10 parts by weight of copolymerizable monomer having a cross-linkable functional group.

5. The pressure-sensitive adhesive composition of claim 4, wherein the cross-linkable functional group is a hydroxyl group, a carboxyl group, an epoxy group, an isocyanate group or a nitrogen-containing functional group.

6. The pressure-sensitive adhesive composition of claim 1, wherein the ionic compound is an organic salt.

7. The pressure-sensitive adhesive composition of claim 6, wherein the organic salt comprises at least one cation selected from the group consisting of quaternary ammonium, phosphonium, pyridinium, imidazolium, pyrrolidinium and piperidinium.

8. The pressure-sensitive adhesive composition of claim 7, wherein the quaternary ammonium is represented by the following Formula 3:

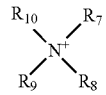

Formula 3 wherein $R_7$ to $R_{10}$ each independently represent hydrogen, alkyl, alkoxy, alkenyl or alkynyl group.

9. The pressure-sensitive adhesive composition of claim 8, wherein the "$R_7$" to "$R_{10}$" each independently represent a linear or branched alkyl having 1 to 12 carbon atoms, with the proviso that the "$R_7$" to "$R_{10}$" are not an alkyl having the same number of carbon atom(s) at the same time.

10. The pressure-sensitive adhesive composition of claim 6, wherein the organic salt comprises an anion represented by the following Formula 4:

$$[X(YO_m R_f)_n] \qquad \text{Formula 4}$$

wherein X represents N or C, Y represents C or S, $R_f$ represents a perfluoroalkyl group, m is an integer of 1 or 2, and n is an integer of 2 or 3.

11. The pressure-sensitive adhesive composition of claim 1, wherein the metal salt comprises an alkali metal cation or an alkaline earth metal cation.

12. The pressure-sensitive adhesive composition of claim 1, wherein the metal salt includes at least one anion selected from the group consisting of fluoride, chloride, bromide, iodide, perchlorate, hydroxide, carbonate, nitrate, trifluoromethanesulfonate, sulfonate, hexafluorophosphate, methylbenzenesulfonate, p-toluenesulfonate, tetraborate, carboxybenzenesulfonate, trifluoromethanesulfonate, benzoate, acetate, trifluoroacetate, tetrafluoroborate, tetrabenzylborate, trispentafluoroethyl trifluorophosphate, and an anion represented by the following Formula 4:

$$[X(YO_m R_f)_n] \qquad \text{Formula 4}$$

wherein X represents N or C, Y represents C or S, $R_f$ represents a perfluoroalkyl group, m is an integer of 1 or 2, n is an integer of 2 or 3.

13. The pressure-sensitive adhesive composition of claim 1, further comprising 0.01 to 10 parts by weight of multifunctional cross-linking agent, relative to 100 parts by weight of the acrylic polymer.

14. The pressure-sensitive adhesive composition of claim 1, further comprising a silane coupling agent or a tackifier.

15. The pressure-sensitive adhesive composition of claim 1, which satisfies the requirements of the following General Relation 4:

$$\Delta SR_B = \log SR3 - \log SR1 \leq 1.0 \qquad \text{General Relation 4}$$

wherein the "SR1" is the same as defined in the General Relation 3 of claim 1, and the "SR3" is a surface resistance measured after curing the same pressure-sensitive adhesive composition as that used for the measurement of SR1, maintaining for 500 hours at 80° C., and then maintaining again for 24 hours at 23° C. and 50% relative humidity.

16. The pressure-sensitive adhesive composition of claim 1, which has a gel fraction after being cured of 50 to 90 weight %.

17. The pressure-sensitive adhesive composition of claim 1, which has a peel strength of 150 gf/25 mm or more, the peel strength being measured at room temperature at a peel angle of 180 degrees and a peel rate of 0.3 m/min after attaching the pressure-sensitive adhesive composition on glass in the form of a pressure-sensitive adhesive.

18. A polarizing plate comprising:
   a polarizer; and
   a pressure-sensitive adhesive layer that is formed on one or both sides of the polarizer, and that comprises the pressure-sensitive adhesive composition of claim 1 in a cured state, the pressure-sensitive adhesive layer being for attaching the polarizing plate on a liquid crystal panel.

19. A liquid crystal display device comprising:
   a liquid crystal panel; and
   the polarizing plate of claim 18 that is attached to one or both sides of the liquid crystal panel.

* * * * *